J. C. COONLEY.
Cast Hook.

No. 159,304.  Patented Feb. 2, 1875.

Witnesses:  Inventor:

UNITED STATES PATENT OFFICE.

JOHN C. COONLEY, OF CHICAGO, ILLINOIS.

IMPROVEMENT IN CAST HOOKS.

Specification forming part of Letters Patent No. 159,304, dated February 2, 1875; application filed December 15, 1874.

*To all whom it may concern:*

Be it known that I, JOHN C. COONLEY, of Chicago, county of Cook and State of Illinois, have invented a Cast Hook, of which the following is a description, reference being had to the accompanying drawings, which form a part of this specification.

My invention consists in casting the pin C with the hook, and casting the hook with the hole D to receive the pin C, the hook and pin being cast of malleable iron, so that the eye of the hook can be closed when cold, and the pin C headed, as shown.

Figure 1:
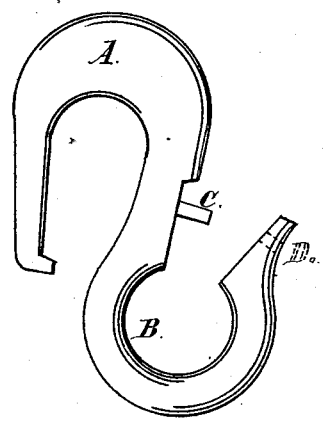
Figure 2:
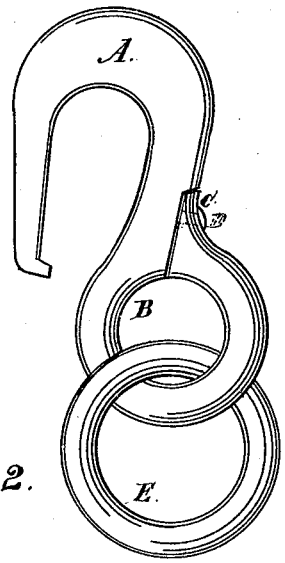

In the accompanying drawings, Figure 1 represents my cast hook in the form in which it is cast, and Fig. 2 represents it with the eye closed and the pin headed, as the hook is when completed ready for use.

My hook, A, is intended to be used largely as a trace-hook, but may be used for any purpose, and the hook part proper may be cast in any of the well-known forms of hooks. The novelty consists in casting the pin C and the hole D to receive the pin, but the hook must be cast of malleable iron to enable me to close the eye B of the hook, and head the pin to hold the eye closed. E represents a ring, which may be put in the eye of the hook before it is closed, to facilitate its use in many instances.

In molding the hook care is always taken to have the opening D so arranged that when the eye is closed the pin C will pass through said hole. The pin also is cast of sufficient length to reach through the hole D far enough to admit of its being headed, as shown in Fig. 2.

Having described my invention, what I claim, and desire to secure by Letters Patent, is—

The malleable hook A, cast with the pin C and hole D, so as to enable the eye B to be closed when cold and the pin headed, substantially as specified.

JNO. C. COONLEY.

Witnesses:
HEINRICH F. BRUNS,
L. A. BUNTING.